US012593262B2

(12) United States Patent
Han et al.

(10) Patent No.: US 12,593,262 B2
(45) Date of Patent: Mar. 31, 2026

(54) METHOD AND APPARATUS FOR TERMINAL TO ACCESS NETWORK, DEVICE, AND READABLE STORAGE MEDIUM

(71) Applicant: VIVO MOBILE COMMUNICATION CO., LTD., Guangdong (CN)

(72) Inventors: Lufeng Han, Chang'an Dongguan (CN); Yanchao Kang, Chang'an Dongguan (CN); Pengfei Zhang, Chang'an Dongguan (CN); Wen Wang, Chang'an Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 443 days.

(21) Appl. No.: 18/127,615

(22) Filed: Mar. 28, 2023

(65) Prior Publication Data

US 2023/0239766 A1 Jul. 27, 2023

Related U.S. Application Data

(63) Continuation of application No. PCT/CN2021/121832, filed on Sep. 29, 2021.

(30) Foreign Application Priority Data

Sep. 30, 2020 (CN) .......................... 202011066450.2

(51) Int. Cl.
*H04W 48/06* (2009.01)
*H04W 36/14* (2009.01)
(Continued)

(52) U.S. Cl.
CPC ....... *H04W 48/06* (2013.01); *H04W 36/1443* (2023.05); *H04W 48/16* (2013.01); *H04W 76/50* (2018.02)

(58) Field of Classification Search
CPC ....... H04W 48/06; H04W 4/90; H04W 48/10; H04W 48/18
(Continued)

(56) References Cited

U.S. PATENT DOCUMENTS 10,986,562 B2 * 4/2021 Kim ...................... H04W 48/02
11,457,398 B2 * 9/2022 Lindheimer .......... H04W 48/08
(Continued)

FOREIGN PATENT DOCUMENTS

JP 2016510583 A 4/2016
JP 2020524918 A 8/2020

OTHER PUBLICATIONS

"3rd Generation Partnership Project; Technical Specification Group Services and System Aspects; Study on Support for Minimization of Service Interruption(Release 17)," 3GPP TR 22.831, V0.1.1, pp. 1-21, (Aug. 31, 2019).
(Continued)

*Primary Examiner* — Qutbuddin Ghulamali
(74) *Attorney, Agent, or Firm* — Perilla Knox & Hildebrandt LLP; Kenneth A. Knox

(57) ABSTRACT

This application discloses a method and an apparatus for a terminal to access a network, a device, and a readable storage medium. The method includes: in a case that an event corresponding to a MINT function occurs in a first network, performing access control on an access request, triggered by the MINT function, for accessing a second network.

20 Claims, 9 Drawing Sheets

(51) Int. Cl.
*H04W 48/16*       (2009.01)
*H04W 76/50*       (2018.01)

(58) Field of Classification Search
USPC ..................................................... 455/435.1
See application file for complete search history.

(56)          References Cited

U.S. PATENT DOCUMENTS

| | | | | |
|---|---|---|---|---|
| 11,729,698 | B1 * | 8/2023 | Marupaduga ....... | H04W 36/165 |
| | | | | 370/331 |
| 2014/0051379 | A1 | 2/2014 | Ganesh et al. | |
| 2015/0055447 | A1 * | 2/2015 | Jamadagni ............ | H04W 48/18 |
| | | | | 370/216 |
| 2016/0014632 | A1 | 1/2016 | Siow et al. | |
| 2017/0245188 | A1 * | 8/2017 | Kim ...................... | H04W 48/16 |
| 2018/0199273 | A1 | 7/2018 | Chun | |
| 2019/0159108 | A1 | 5/2019 | Lee et al. | |
| 2020/0275344 | A1 * | 8/2020 | Byun .................... | H04W 48/08 |

OTHER PUBLICATIONS

LG Electronics, et al. "On Access control for MINT," 3GPP TSG-SA WG1 Meeting #88, S1-193018, pp. 1-4, (Nov. 22, 2019).
International Search Report and Written Opinion of the International Searching Authority dated Dec. 29, 2021 as received in Application No. PCT/CN2021/121832.
"3rd Generation Partnership Project; Technical Specification Group Services and System Aspects; Study on Support for Minimization of Service Interruption (Release 17)," 3GPP TR 22.831 V02.1, Sep. 2019, pp. 1-20.
"3rd Generation Partnership Project, Technical Specification Group Services and System Aspects; Service Requirements for the 5G System; Stage 1, (Release 17)," 3GPP TS 22.261 V17.3.0, Jul. 20, pp. 1-83.
LG Electronics Inc., TP to 38.331 on UAC), 3GPP TSG-RAN WG2 #102, R2-1809088, Busan Republic of Korea, May 21-25, 2018.

\* cited by examiner

12

11

11

201

In a case that an event corresponding to a MINT function occurs in a first
network, perform access control on an access request, triggered by the
MINT function, for accessing a second network

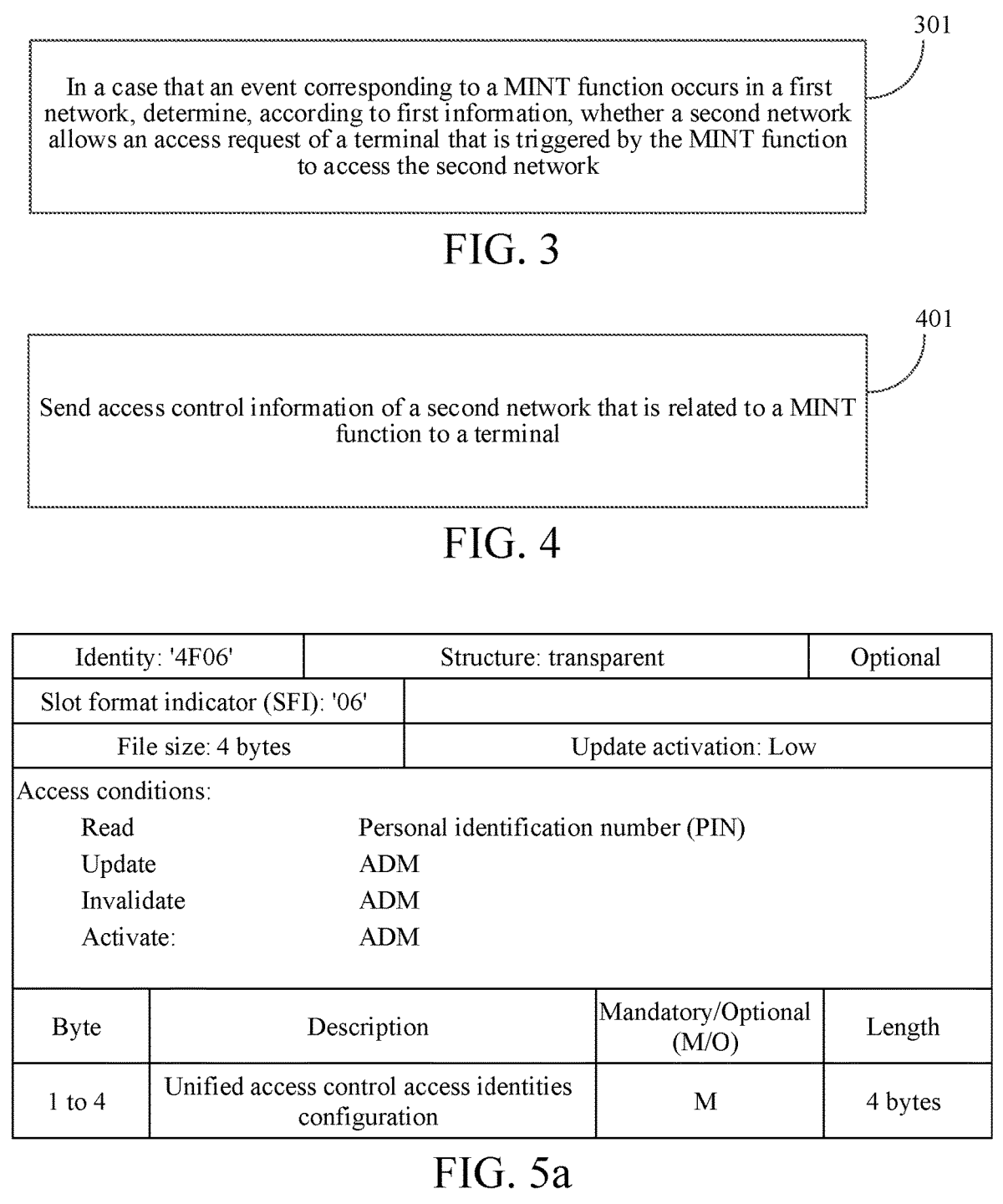

301

In a case that an event corresponding to a MINT function occurs in a first network, determine, according to first information, whether a second network allows an access request of a terminal that is triggered by the MINT function to access the second network

Send access control information of a second network that is related to a MINT function to a terminal

FIG. 4

| Identity: '4F06' | Structure: transparent | Optional |
|---|---|---|
| Slot format indicator (SFI): '06' | | |
| File size: 4 bytes | Update activation: Low | |

Access conditions:

| | | |
|---|---|---|
| Read | Personal identification number (PIN) | |
| Update | ADM | |
| Invalidate | ADM | |
| Activate: | ADM | |

| Byte | Description | Mandatory/Optional (M/O) | Length |
|---|---|---|---|
| 1 to 4 | Unified access control access identities configuration | M | 4 bytes |

FIG. 5a

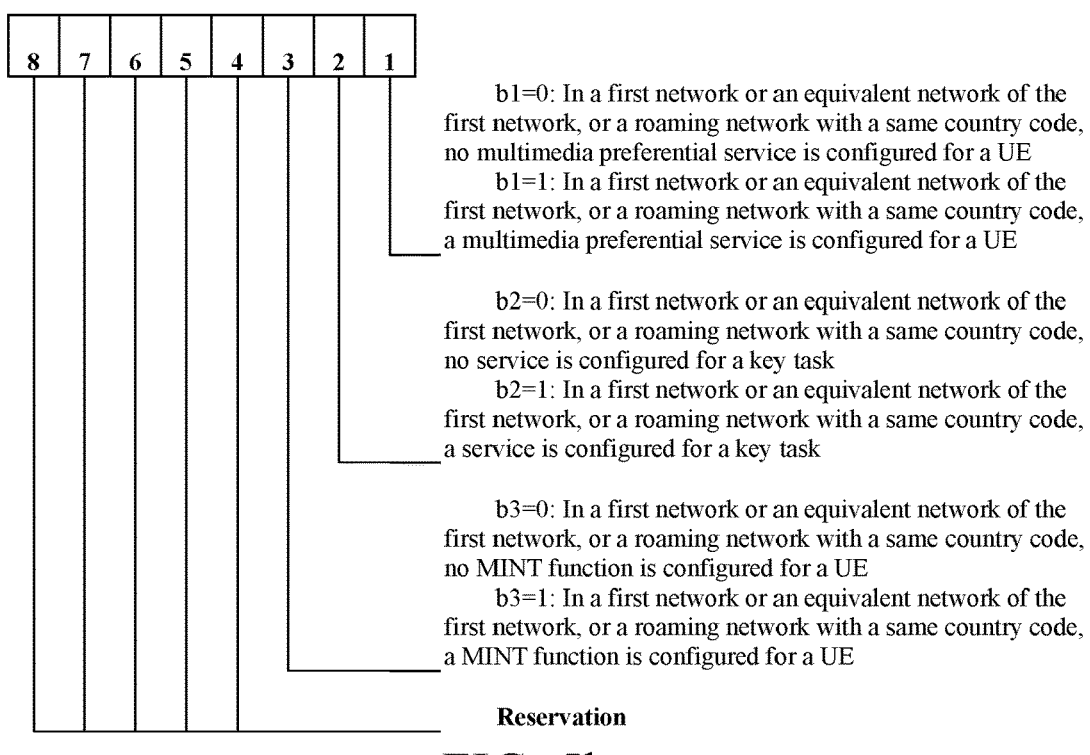

b1=0: In a first network or an equivalent network of the first network, or a roaming network with a same country code, no multimedia preferential service is configured for a UE
    b1=1: In a first network or an equivalent network of the first network, or a roaming network with a same country code, a multimedia preferential service is configured for a UE b2=0: In a first network or an equivalent network of the first network, or a roaming network with a same country code, no service is configured for a key task
    b2=1: In a first network or an equivalent network of the first network, or a roaming network with a same country code, a service is configured for a key task b3=0: In a first network or an equivalent network of the first network, or a roaming network with a same country code, no MINT function is configured for a UE
    b3=1: In a first network or an equivalent network of the first network, or a roaming network with a same country code, a MINT function is configured for a UE

Reservation

FIG. 5b

| 8 | 7 | 6 | 5 | 4 | 3 | 2 | 1 | |
|---|---|---|---|---|---|---|---|---|
| 5G system network feature support information element identity ||||||||| Octet 1 |
| Length of 5G system network feature support content ||||||||| Octet 2 |
| MPSI | IWK N26 | EMF || EMC || IMS-VoPS-N3GPP | IMS-VoPS-3GPP | Octet 3 |
| 5G-UP CIoT | 5G- HC-CP CIoT | N3 data | 5G-IPHC-CP CIoT | RestrictEC || MCSI | EMCN3 | Octet 4 |
| 0 spare | 0 spare | 0 spare | 0 spare | MINT | 5G-EHC-CP CIoT | ATS-IND | 5G-LCS | Octet 5 |

FIG. 6

MINT: a MINT function indication

The bit indicates whether the MINT function is supported

Bit

1

0          The MINT function is not supported

1          The MINT function is supported

FIG. 7

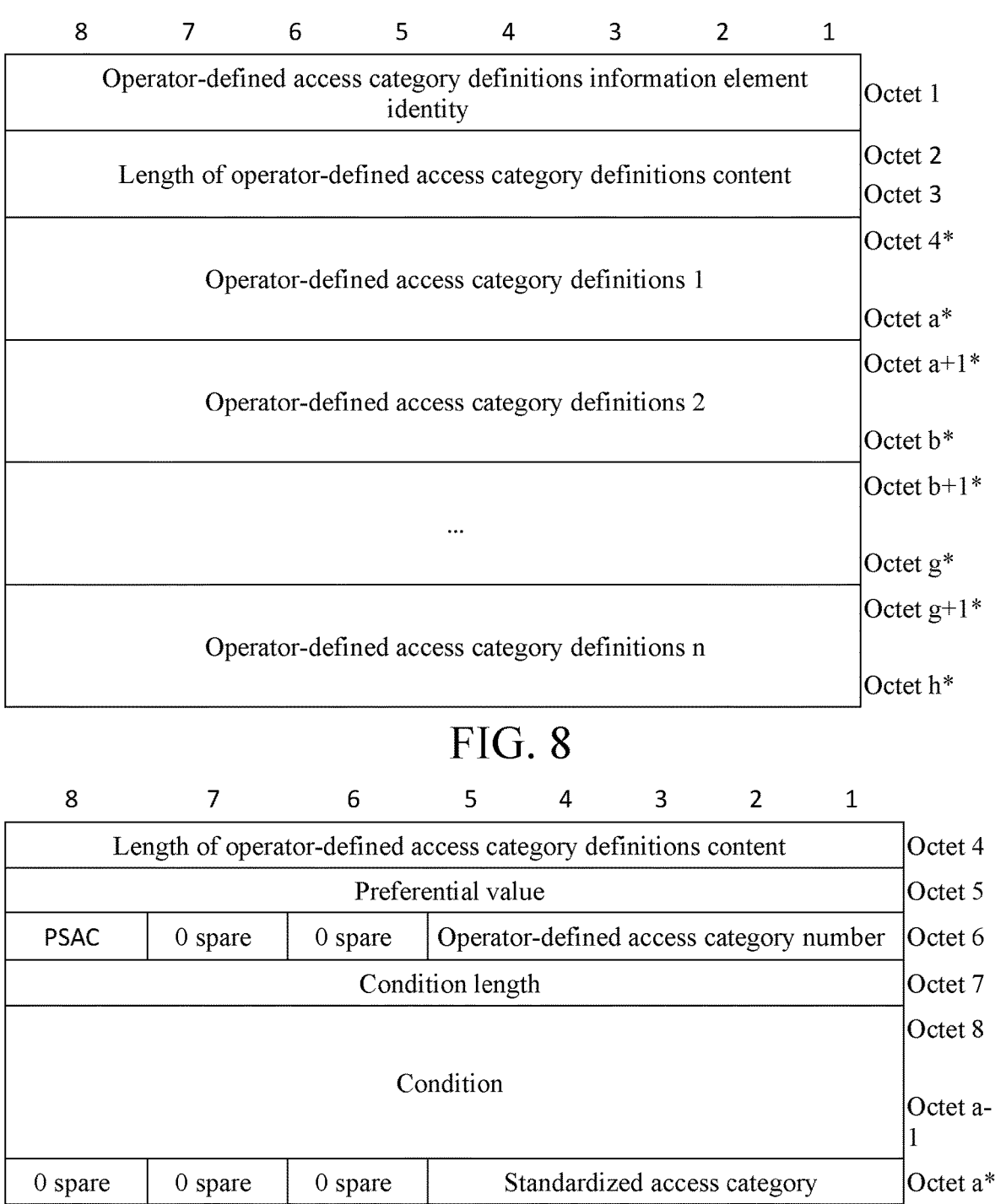

| 8 | 7 | 6 | 5 | 4 | 3 | 2 | 1 | |
|---|---|---|---|---|---|---|---|---|
| Operator-defined access category definitions information element identity | | | | | | | | Octet 1 |
| Length of operator-defined access category definitions content | | | | | | | | Octet 2 / Octet 3 |
| Operator-defined access category definitions 1 | | | | | | | | Octet 4* / Octet a* |
| Operator-defined access category definitions 2 | | | | | | | | Octet a+1* / Octet b* |
| ... | | | | | | | | Octet b+1* / Octet g* |
| Operator-defined access category definitions n | | | | | | | | Octet g+1* / Octet h* |

FIG. 8

| 8 | 7 | 6 | 5 | 4 | 3 | 2 | 1 | |
|---|---|---|---|---|---|---|---|---|
| Length of operator-defined access category definitions content | | | | | | | | Octet 4 |
| Preferential value | | | | | | | | Octet 5 |
| PSAC | 0 spare | 0 spare | Operator-defined access category number | | | | | Octet 6 |
| Condition length | | | | | | | | Octet 7 |
| Condition | | | | | | | | Octet 8 / Octet a-1 |
| 0 spare | 0 spare | 0 spare | Standardized access category | | | | | Octet a* |

FIG. 9

Figure 10:
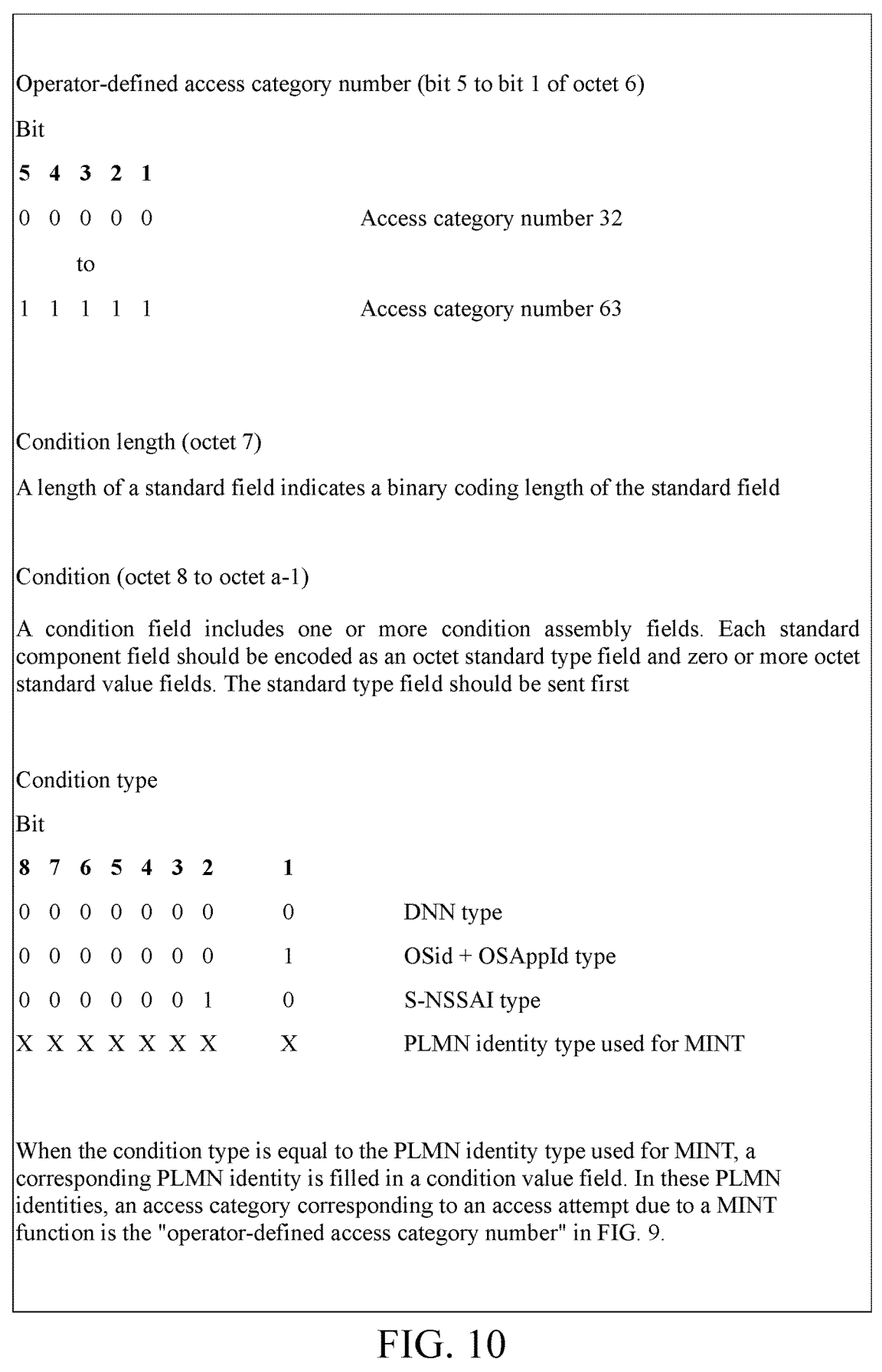

Operator-defined access category number (bit 5 to bit 1 of octet 6)

Bit

5  4  3  2  1

0  0  0  0  0                    Access category number 32 to 1  1  1  1  1                    Access category number 63

Condition length (octet 7)

A length of a standard field indicates a binary coding length of the standard field Condition (octet 8 to octet a-1)

A condition field includes one or more condition assembly fields. Each standard component field should be encoded as an octet standard type field and zero or more octet standard value fields. The standard type field should be sent first Condition type Bit

8  7  6  5  4  3  2    1

0  0  0  0  0  0  0    0        DNN type 0  0  0  0  0  0  0    1        OSid + OSAppId type 0  0  0  0  0  0  1    0        S-NSSAI type X  X  X  X  X  X  X    X        PLMN identity type used for MINT When the condition type is equal to the PLMN identity type used for MINT, a corresponding PLMN identity is filled in a condition value field. In these PLMN identities, an access category corresponding to an access attempt due to a MINT function is the "operator-defined access category number" in FIG. 9.

First processing module
1201

1300

Sending module
1301

METHOD AND APPARATUS FOR TERMINAL TO ACCESS NETWORK, DEVICE, AND READABLE STORAGE MEDIUM

CROSS-REFERENCE TO RELATED APPLICATIONS

This application is a continuation application of International Application No. PCT/CN2021/121832 filed on Sep. 29, 2021, which claims the priority of Chinese Patent Application No. 202011066450.2 filed in China on Sep. 30, 2020, the entire content of which is hereby incorporated by reference.

TECHNICAL FIELD

This application relates to the field of communication technologies, and specifically, to a method and an apparatus for a terminal to access a network, a device, and a readable storage medium.

BACKGROUND

In a case that a network may fail to provide normal services when some disaster events (for example, fire, earthquake, and tsunami) occur, a terminal in the network cannot obtain normal services in the network in which the disasters occur, and a large quantity of terminals in the network may simultaneously attempt to access a second network, causing network resources of the second network to be strained and congested, or even functions to be paralyzed.

SUMMARY

An objective of embodiments of this application is to provide a method and an apparatus for a terminal to access a network, a device, and a readable storage medium.

According to a first aspect, a method for a terminal to access a network is provided, applied to a terminal. The method includes:

in a case that an event corresponding to a minimization of service interruption MINT function occurs in a first network, performing access control on an access request, triggered by the MINT function, for accessing a second network.

According to a second aspect, a method for a terminal to access a network is provided, applied to a network side device. The method includes:

sending access control information of a second network that is related to a MINT function to a terminal, where the access control information of the second network that is related to the MINT function and/or a configuration of the terminal that is related to the MINT function is used for assisting the terminal in: in a case that an event corresponding to the MINT function occurs in a first network, performing access control on an access request, triggered by the MINT function, for accessing the second network.

According to a third aspect, an apparatus for a terminal to access a network is provided, applied to a terminal. The apparatus includes:

a first processing module, configured to: in a case that an event corresponding to a MINT function occurs in a first network, perform access control on an access request, triggered by the MINT function, for accessing a second network.

According to a fourth aspect, an apparatus for a terminal to access a network is provided, applied to a network side device. The apparatus includes:

a sending module, configured to send access control information of a second network that is related to a MINT function to a terminal, where the access control information of the second network that is related to the MINT function and/or a configuration of the terminal that is related to the MINT function is used for assisting the terminal in: in a case that an event corresponding to the MINT function occurs in a first network, perform access control on an access request, triggered by the MINT function, for accessing the second network.

According to a fifth aspect, a terminal is provided, including: a processor, a memory, and a program stored in the memory and capable of being run on the processor, where the program, when executed by the processor, implements the steps of the method according to the first aspect.

According to a sixth aspect, a network side device is provided, including: a processor, a memory, and a program stored in the memory and capable of being run on the processor, where the program, when executed by the processor, implements the steps of the method according to the second aspect.

According to a seventh aspect, a readable storage medium is provided, where the readable storage medium stores a program or an instruction, and the program or the instruction, when executed by a processor, implements the steps of the method according to the first aspect or the second aspect.

According to an eighth aspect, a program product is provided, where the program product is stored in a non-volatile storage medium, and the program product is executed by at least one processor to implement the steps of the method according to the first aspect or the second aspect.

According to a ninth aspect, a chip is provided, where the chip includes a processor and a communication interface, the communication interface is coupled with the processor, and the processor is configured to run a program or an instruction to implement the method according to the first aspect or the second aspect.

According to a tenth aspect, a terminal is provided, where the terminal is configured to perform the method according to the first aspect.

According to an eleventh aspect, a network side device is provided, where the network side device is configured to perform the method according to the second aspect.

In the embodiments of this application, when the event corresponding to the MINT function occurs in the first network, the terminal determines whether the second network allows the terminal to access, to avoid congestion in the second network caused by a large quantity of terminals simultaneously attempting to access the second network.

BRIEF DESCRIPTION OF THE DRAWINGS

FIG. 3 is a schematic diagram 2 of a method for a terminal to access a network according to an embodiment of this application;

FIG. 4 is a schematic diagram 3 of a method for a terminal to access a network according to an embodiment of this application;

FIG. 5a and FIG. 5b are schematic diagrams of an access identity configuration according to Embodiment 1 of embodiments of this application;

FIG. 6 is a schematic diagram of a fifth generation (5G) system network feature support information element according to Embodiment 2 of the embodiments of this application;

FIG. 7 is a schematic diagram indicating whether a second network supports a MINT function according to Embodiment 2 of the embodiments of this application;

FIG. 8 is a schematic diagram 1 of an operator-defined access category definitions information element according to Embodiment 4 of the embodiments of this application;

FIG. 9 is a schematic diagram 2 of an operator-defined access category definitions information element according to Embodiment 4 of the embodiments of this application;

FIG. 10 is a schematic diagram 3 of an operator-defined access category definitions information element according to Embodiment 4 of the embodiments of this application;

DETAILED DESCRIPTION

The following clearly and completely describes the technical solutions in embodiments of this application with reference to the accompanying drawings in the embodiments of this application. Apparently, the described embodiments are some but not all of the embodiments of this application. All other embodiments obtained by a person of ordinary skill in the art based on the embodiments of this application without creative efforts shall fall within the protection scope of this application.

In the specification and claims of this application, the terms "first", "second", and so on are intended to distinguish between similar objects but do not indicate a specific order or sequence. It should be understood that the data so used may be interchanged in an appropriate condition, so that the embodiments of this application can be implemented in a sequence other than those illustrated or described herein. In addition, objects distinguished by "first" and "second" are usually a same type, and a quantity of the objects is not limited, for example, a first object may be one or may be a plurality. In addition, "and" in this specification and the claims represents at least one of the connected objects. A character "I" generally indicates an "or" relationship between the associated objects.

It should be noted that, the technologies described in the embodiments of this application are not limited to a long term evolution (LTE)/LTE-advanced (LTE-A) system, and may be further applied to other wireless communication systems, such as code division multiple access (CDMA), time division multiple access (TDMA), frequency division multiple access (FDMA), orthogonal frequency division multiple access (OFDMA), single-carrier frequency-division multiple access (SC-FDMA), and other systems. In the embodiments of this application, the terms "system" and "network" may usually be used interchangeably. The described technology can be applied to the systems and radio technologies mentioned above, and can also be applied to other systems and radio technologies. However, the following description describes a new radio (NR) system for an exemplary objective, and uses NR terms in most of the following description, though such technologies may also be applied to applications except an NR system application, such as a 6th generation (6G) communication system.

Figures 1, 2:
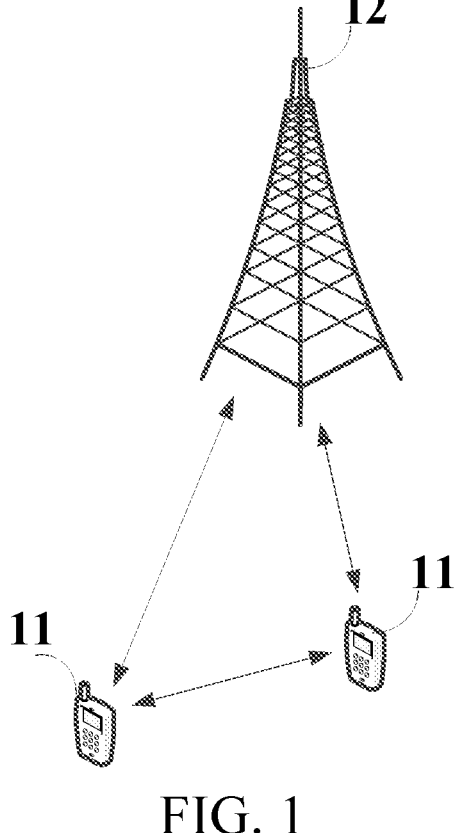
FIG. 1 is a block diagram of a wireless communication system to which an embodiment of this application is applicable.
FIG. 2 is a schematic diagram 1 of a method for a terminal to access a network according to an embodiment of this application.

FIG. 1 shows a block diagram of a wireless communication system that may be applied to an embodiment of this application; The wireless communication system includes a terminal 11 and a network device 12. The terminal 11 may also be referred to as a terminal device or a user equipment (UE). The terminal 11 may be a mobile phone, a tablet personal computer, a laptop computer referred to as a notebook computer, a personal digital assistant (PDA), a palm personal computer, a netbook, an ultra-mobile personal computer (UMPC), a mobile Internet device (MID), a wearable device or a vehicle user equipment (VUE), a pedestrian user equipment (PUE), or other terminal side devices. The wearable device includes: a smart watch, an earphone, glasses, and the like. It should be noted that, a specific type of the terminal 11 is not limited in the embodiments of this application. The network side device 12 may be a base station or a core network, where the base station may be referred to as a NodeB, an evolved NodeB, an access point, a base transceiver station (BTS), a radio base station, a radio transceiver, a basic service set (BSS), an extended service set (ESS), a NodeB, an evolved NodeB (eNB), a home NodeB, a home evolved NodeB, a wireless local area network (WLAN) access point, a wireless fidelity (WiFi) node, a transmitting receiving point (TRP), or another suitable term in the field. As long as the same technical effects can be achieved, the base station is not limited by a specific technical term. It should be noted that, a base station in the NR system is merely used as an example in the embodiments of this application, but a specific type of the base station is not limited.

In the embodiments of this application, in a case that a first network may fail to provide normal services when some disaster events (for example, fire, earthquake, and tsunami) occur, a terminal attempts to access another network that supports the terminal to access. The function is referred to as a minimization of service interruption (MINT) function, and the disaster event is referred to as a disaster event corresponding to the MINT function.

When an event corresponding to the MINT function occurs, a UE expects that when the UE attempts to access a second network to obtain a service, a terminal performing the MINT function determines an access identity and/or an access category corresponding to this access, and/or MINT access control information sent from the network, to perform access control.

Behaviors of terminal: a first parameter in the terminal indicates the access identity corresponding to the MINT function, and the first parameter is stored in a universal subscriber identity module (USIM) or a non-volatile memory in the terminal. According to one or more of a configuration for the MINT function by the terminal, the access identity and access category corresponding to the MINT function, and MINT access control information of the second network, the terminal checks whether the terminal can access the second network.

Behaviors of network side device: the network side device may send the access control information corresponding to the MINT function to the terminal. For example: the access control information is an operator-defined Access Category corresponding to an access attempt upon performing the MINT function and an access probability performed on the access category; or if the access is forbidden due to the MINT function, how long the UE is expected to wait before reattempting.

The following describes a method and an apparatus for a terminal to access a network, a device, and a readable storage medium provided in the embodiments of this application in detail with reference to the accompanying drawings by using specific embodiments and application scenarios thereof.

Referring to FIG. 2, an embodiment of this application provides a method for a terminal to access a network. An execution subject of the method may be a terminal, and specific steps include: Step 201.

Step 201: In a case that an event (a disaster event, such as fire, earthquake, or tsunami) corresponding to a MINT function occurs in a first network, perform access control on an access request, triggered by the MINT function, for accessing a second network.

In this embodiment of this application, after step 201, the method further includes: initiating the access request to the second network if the second network allows the terminal to access; or reattempting to access the second network if the second network currently does not allow the terminal to access.

Optionally, the reattempting to access the second network includes: determining an access barring condition according to the access control information of the second network; starting a timer according to the access barring condition; and reattempt to access the second network after the timer expires.

In the embodiments of this application, when the event corresponding to the MINT function occurs in the first network, the terminal determines whether the second network allows the terminal to access, to avoid congestion in the second network caused by a large quantity of terminals simultaneously attempting to access the second network.

Referring to FIG. 3, an embodiment of this application provides a method for a terminal to access a network. An execution subject of the method may be a terminal, and specific steps include: Step 301.

Step 301: In a case that an event corresponding to a MINT function occurs in a first network, determine, according to first information, whether a second network allows an access request of a terminal that is triggered by the MINT function to access the second network, where the first information includes one or more of the following:

(1) a configuration of the terminal that is related to the MINT function:

for example, an access identity or an access category.

(2) access control information of the second network that is related to the MINT function.

In some implementations of this embodiment of this application, in step 301, it is determined, according to an access identity selected by the terminal that corresponds to the MINT function and a received access identity corresponding to the second network supporting the MINT function, whether the second network allows the access request of the terminal that is triggered by the MINT function to access the second network.

Optionally, before step 301, the method further includes: determining whether the second network supports the MINT function; and if the second network supports the MINT function, selecting, upon an access attempt in the second network, the access identity indicated (for example, indicated in a broadcast manner) by the second network that corresponds to the MINT function.

Optionally, the determining whether the second network supports the MINT function includes: obtaining a function list supported by the second network: and determining whether the second network supports the MINT function according to the function list supported by the second network.

Optionally, a universal subscriber identity module (USIM) or a non-volatile memory of the terminal stores a first parameter, where the first parameter indicates the access identity corresponding to the MINT function.

In some other implementations of this embodiment of this application, in step 301, it is determined, according to an access category selected by the terminal that corresponds to the MINT function and an access category corresponding to the second network supporting the MINT function, whether the second network allows the access request of the terminal that is triggered by the MINT function to access the second network.

Optionally, before step 301, the method may further include: obtaining an operator-defined access category corresponding to the MINT function through the first network or second network.

Optionally, before step 301, the method further includes: receiving the access control information of the second network that is related to the MINT function.

Optionally, the access control information includes one or more of the following:

(1) The access identity corresponding to the second network supporting the MINT function.

(2) The access category corresponding to the second network supporting the MINT function.

(3) An access probability corresponding to the access category and/or access identity.

For example, the network broadcasts an access probability corresponding to a MINT access category, such as 0.9. The terminal locally generates a random number ranging from 0 to 1. If the random number is less than 0.9, it is allowed to initiate an access, or if the random number is equal to or greater than 0.9, it is not allowed to initiate an access temporarily.

It may be understood that, a specific value of the access probability is not limited in this embodiment of this application.

(4) An unforbidden access request of a first category, where the access request of a first category is triggered by the MINT function.

It may be further limited that the access request of the first category is triggered by the MINT function when the terminal accesses to some specific networks.

(5) An unforbidden access request of a second category, where the access request of a second category is triggered by a user of some specific networks (such as the first network) due to the MINT function. For example, the second network may indicate, in broadcast information, that a terminal of some networks (such as the first network) can access the second network.

(6) A delayed access request of a third category, where the access request of a third category is triggered by the MINT function or a user of a specific network (such as the first network) due to the MINT function.

(7) An access-delayed time.

In this embodiment of this application, after step 301, the method further includes: initiating the access request to the second network if the second network allows the terminal to access; or reattempting to access the second network if the second network currently does not allow the terminal to access.

Optionally, the reattempting to access the second network includes: determining an access barring condition according to the access control information of the second network; starting a timer according to the access barring condition; and reattempting to access the second network after the timer expires.

In this embodiment of this application, in a case that the first network may fail to provide normal services when some disaster events (for example, fire, earthquake, and tsunami) occur, the terminal attempts to access the second network that supports the terminal to access, and it is determined, according to the configuration of the terminal that is related to the MINT function and/or the access control information of the second network that is related to the MINT function, whether the second network allows the terminal to access, thereby improving a probability for the terminal to access the second network due to the MINT function and improving usage efficiency of network access resources when a MINT-related event occurs.

Referring to FIG. 4, an embodiment of this application provides a method for a terminal to access a network. An execution subject of the method is a network side device, and specific steps include: Step 401.

Step 401: sending access control information of a second network that is related to a MINT function to a terminal, where the access control information of the second network that is related to the MINT function and/or a configuration of the terminal that is related to the MINT function is used for assisting the terminal in: in a case that an event corresponding to the MINT function occurs in a first network, performing access control on an access request, triggered by the MINT function, for accessing the second network.

Optionally, the access control information includes one or more of the following:

(1) an access identity corresponding to the second network supporting the MINT function;

(2) an access category corresponding to the second network supporting the MINT function;

(3) an access probability corresponding to the access category and/or access identity;

(4) an unforbidden access request of a first category, where the access request of a first category is triggered by the MINT function;

(5) an unforbidden access request of a second category, where the access request of a second category is triggered by a user of a specific network (such as the first network) due to the MINT function;

(6) a delayed access request of a third category, where the access request of a third category is triggered by the MINT function or a user of a specific network (such as the first network) due to the MINT function; or (7) an access-delayed time.

In this embodiment of this application, the network side device sends the access control information of the second network that is related to the MINT function to the terminal. In a case that the first network may fail to provide normal services when some disaster events occur, the terminal attempts to access the second network that supports the terminal to access, and it is determined, according to the configuration of the terminal that is related to the MINT function and/or the access control information of the second network that is related to the MINT function, whether the second network allows the terminal to access, thereby improving a probability for the terminal to access the second network due to the MINT function and improving usage efficiency of network access resources when a MINT-related event occurs.

The following describes this embodiment of this application with reference to Embodiment 1 to Embodiment 5.

Embodiment 1—Access Identity Configuration Information Corresponding to the MINT Function is Added in a USIM Referring to FIG. 5*a* or FIG. 5*b*, the access identity configuration information for the MINT function by the terminal may be added in a document EFUAC_AIC of the USIM. In a unified access control access identities configuration (UAC access identities configuration), values of one or more bits are used for indicating access identity information corresponding to the MINT function (for example, valid or not, and/or a value).

Embodiment 2—The Access Identity Corresponding to the MINT Function

When an event corresponding to the MINT function occurs, the terminal expects that when the terminal attempts to access the second network to obtain a service, a UE performing the MINT function selects an access identity used in the access attempt.

It should be understood that, the process of selecting the access identity used in the access attempt may be related to whether the second network supports the MINT function. For example, the access identity corresponding to the MINT function is selected only when the second network supports the MINT function, and the access identity can be further informed to an access layer.

TABLE 1

| Access identities. | |
| --- | --- |
| access identity number (Access Identity number) | terminal configuration (UE configuration) |
| 0 | A UE is not configured with any parameter in the table |
| 1 (NOTE 1) | The UE configuration is a multimedia preferential service |
| 2 (NOTE 2) | The UE configuration is a key service |
| 3-10 | remained for future spare use |
| K (may be a number, such as a number ranging from 3 to 10) | The UE is configured with a MINT function (UE is configured for Minimization of Service Interruption) |

The access identity K is valid when (Access identity K is valid when): (NOTE 1) a document in a USIM of a terminal or information in a memory of a terminal indicates that: the terminal is configured with the access identity K; a scenario may be further limited: in addition, a PLMN selected by the UE or a registered PLMN is the first network, an equivalent network of the first network (such as an equivalent HPLMN (Equivalent Home PLMN, EHPLMN) of a home PLMN network), or a roaming network with a same country code (for example: a visited PLMN of the home country); or (NOTE 2) if the UE receives indication information of a network that indicates that the second network supports the MINT function, the UE performs processing according to the foregoing 1).

The UE may further determine, according to whether the second network supports the MINT function, whether to select the access identity corresponding to the MINT function upon the access attempt in the second network, for example, reading a function list supported by the second network (such as a 5GS network feature support IE) from signaling of the second network:

if the second network does not support the MINT function, the access identity corresponding to the MINT function is not selected upon the access attempt in the second network; or if the second network supports the MINT function, the access identity corresponding to the MINT function is selected upon the access attempt in the second network.

An example of an access control check process related to the access identity is as follows:

(1) after selecting the access identity, the UE performing the MINT function attempts to initiate a registration request, and the registration request triggers an access request; and (2) the terminal checks the access identity corresponding to the terminal performing the MINT function that is broadcast by the second network, and if it is found that the access is allowed, the access is initiated; if it is found that there is a specific condition (such as a probability) for the access of the access identity, a calculation for the access condition (such as a probability) is performed; if a condition calculation result requires a delayed access, a timer is started, and an access is reattempted after the timer expires; or if a condition calculation result allows the access, the access is initiated.

An example in which the signaling of the second network carries information that the second network supports the MINT function is as follows: a 5GS network feature support IE, referring to "MINT" in FIG. 6. For example, 1 bit is used for indicating whether the MINT function is supported, referring to FIG. 7.

Embodiment 3—A Standard Access Category Corresponding to the MINT Function the access category corresponding to the MINT function may include a standard access category, that is, an access category unified by networks, and an operator-defined access category.

The terminal assigns the access category corresponding to the MINT function according to the standard access category and the operator-defined access category, and then uses the access category to perform an access barring check.

If the terminal has another access reason, such as an emergency call, upon the access attempt triggered by the MINT function, an access category with a greatest probability for allowing the terminal to access is selected based on various access reasons, to perform the access barring check.

The network may send the access category and access identity corresponding to the access request that are related to the MINT function, information indicating the access probability, a calculated delay time, and other parameter information, referring to Table. 2, to the terminal through air-interface signaling.

TABLE 2

| ule # | category of access attempt | requirement to be met | access category |
|---|---|---|---|
| 1 | . . . | | |
| m | access attempt of MINT event | specific requirement 1 | n (MINT event) |
| | . . . | | |

An example of an access control check process related to the access category is as follows:

(1) after selecting the access category, the UE performing the MINT function attempts to initiate a registration request, and the registration request triggers an access request; and (2) the terminal checks the access category corresponding to the UE performing the MINT function that is broadcast by the second network, and if it is found that the access is allowed, the access is initiated; if it is found that there is a specific condition (such as a probability) for the access of the access category, a calculation for the access condition (such as a probability) is performed; if a condition calculation result requires a delayed access, a timer is started, and an access is reattempted after the timer expires; or if a condition calculation result allows the access, the access is initiated.

Embodiment 4—An Operator-Defined Access Category of the MINT Function that is Informed by the Network The network may send the operator-defined access category corresponding to the access request related to the MINT function to the terminal through air-interface signaling. For example:

the first network sends an access category of the first network itself and/or another network (such as the second network) to the terminal through signaling; or the second network sends an access category of the second network itself and/or another network (such as the first network) to the terminal through signaling.

When the terminal attempts to access a network due to the MINT function, if an operator of the network defines an access category used by the terminal upon an access attempt due to the MINT function, in this case, the terminal uses the access category to attempt to access the network.

For example, the network may indicate the operator-defined access category of the MINT function in an operator-defined access category definitions information element (Operator-defined access category definitions IE), referring to FIG. 8.

Referring to FIG. 9 and FIG. 10, the Operator-defined access category definitions IE may be sent to the terminal in an NAS air-interface message CONFIGURATION UPDATE COMMAND and a registration result (successful or failed) message.

Figure 11:
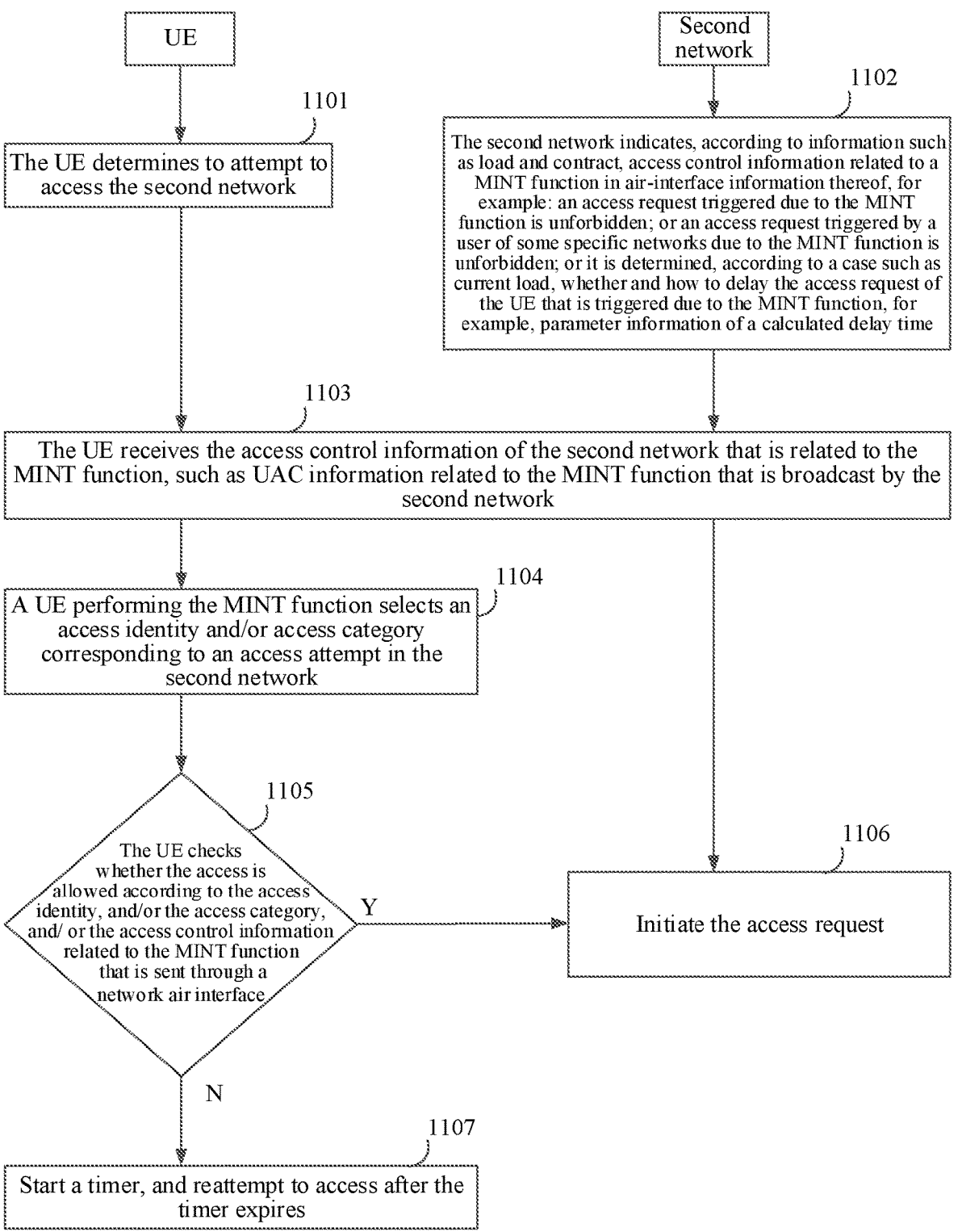
FIG. 11 is a flowchart of an access barring check according to Embodiment 5 of the embodiments of this application.

Embodiment 5—An Access Barring Check Process Corresponding to the MINT Function Referring to FIG. 11, specific steps include: step 1101 to step 1107.

Step 1101: In a case that an event corresponding to a MINT function occurs in a first network, a UE determines to attempt to access a second network.

Step 1102: The second network indicates, according to information such as load and contract, access control information related to the MINT function in air-interface information thereof, for example: an access request triggered due to the MINT function is unforbidden; or an access request triggered by a user of some specific networks (such as some dedicated networks, or a public land mobile network (PLMN) with an assigned country code) due to the MINT function is unforbidden; or it is determined, according to a case such as current load, whether and how to delay the access request of the UE that is triggered due to the MINT function, for example, a calculated delay time.

Step 1103: The UE receives the access control information of the second network that is related to the MINT function, such as UAC information related to the MINT function that is broadcast by the second network.

Step 1104: A UE performing the MINT function selects an access identity and/or access category corresponding to an access attempt in the second network.

Step 1105: The UE checks whether the access is allowed according to the access identity, and/or the access category, and/or the access control information related to the MINT function that is sent through a network air interface, and if the access is allowed, step 1106 is performed; if the access is not allowed, step 1107 is performed.

Step 1106: Initiate the access request.

Step 1107: Start a timer, and reattempt to access after the timer expires.

Figure 12:
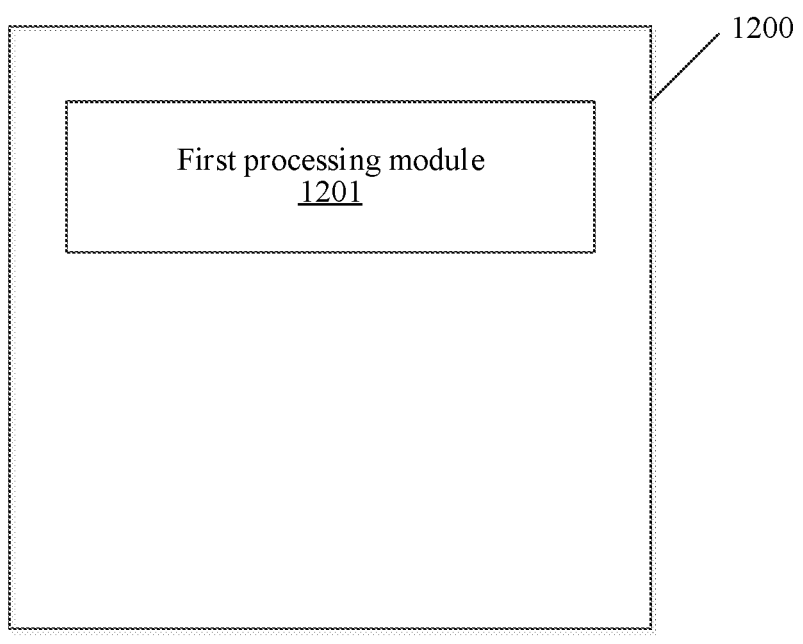
FIG. 12 is a schematic diagram 1 of an apparatus for a terminal to access a network according to an embodiment of this application.

Referring to FIG. 12, an embodiment of this application provides an apparatus for a terminal to access a network, applied to a terminal. The apparatus 1200 includes:

a first processing module 1201, configured to: in a case that an event corresponding to a MINT function occurs in a first network, perform access control on an access request, triggered by the MINT function, for accessing a second network.

In this embodiment of this application, the first processing module 1201 is further configured to: determine, according to first information, whether the second network allows the access request of the terminal that is triggered by the MINT function to access the second network, where the first information includes one or more of the following: a configuration of the terminal that is related to the MINT function or access control information of the second network that is related to the MINT function.

In this embodiment of this application, the first processing module 1201 is further configured to: determine, according to an access identity selected by the terminal that corresponds to the MINT function and a received access identity corresponding to the second network supporting the MINT function, whether the second network allows the access request of the terminal that is triggered by the MINT function to access the second network.

In this embodiment of this application, the apparatus 1200 further includes: a first determining module, configured to determine whether the second network supports the MINT function; and if the second network supports the MINT function, select, upon an access attempt in the second network, the access identity corresponding to the second network supporting the MINT function.

In this embodiment of this application, the first determining module is further configured to: obtain a function list supported by the second network: and determine whether the second network supports the MINT function according to the function list supported by the second network.

In this embodiment of this application, a universal subscriber identity module or a non-volatile memory of the terminal stores a first parameter, where the first parameter indicates the access identity corresponding to the MINT function.

In this embodiment of this application, the apparatus 1200 further includes: a second determining module, configured to determine, according to an access category selected by the terminal that corresponds to the MINT function and an access category corresponding to the second network supporting the MINT function, whether the second network allows the access request of the terminal that is triggered by the MINT function to access the second network.

In this embodiment of this application, the apparatus 1200 further includes: an obtaining module, configured to obtain an operator-defined access category corresponding to the MINT function through the first network or second network.

In this embodiment of this application, the apparatus 1200 further includes: a second processing module, configured to initiate the access request to the second network if the second network allows the terminal to access; or reattempt to access the second network if the second network currently does not allow the terminal to access.

In this embodiment of this application, the second processing module is further configured to: determine an access barring condition according to the access control information of the second network; start a timer according to the access barring condition; and reattempt to access the second network after the timer expires.

In this embodiment of this application, the apparatus 1200 further includes: a receiving module, configured to receive the access control information of the second network that is related to the MINT function.

In this embodiment of this application, the access control information includes one or more of the following:

(1) an access identity corresponding to the second network supporting the MINT function;

(2) an access category corresponding to the second network supporting the MINT function;

(3) an access probability corresponding to the access category and/or access identity;

(4) an unforbidden access request of a first category, where the access request of a first category is triggered by the MINT function;

(5) an unforbidden access request of a second category, where the access request of a second category is triggered by a user of a specific network due to the MINT function;

(6) a delayed access request of a third category, where the access request of a third category is triggered by the MINT function or a user of a specific network due to the MINT function; or (7) an access-delayed time.

The apparatus provided in this embodiment of this application can implement processes implemented by the method embodiment shown in FIG. 2 or FIG. 3, and achieve the same technical effects. To avoid repetition, details are not described herein again.

Figure 13:
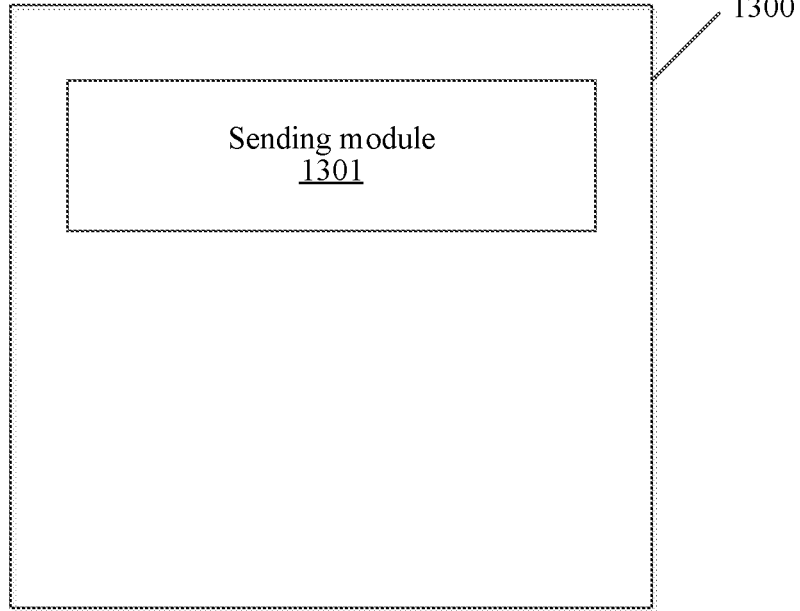
FIG. 13 is a schematic diagram 2 of an apparatus for a terminal to access a network according to an embodiment of this application.

Referring to FIG. 13, an embodiment of this application provides an apparatus for a terminal to access a network, applied to a network side device. The apparatus 1300 includes:

a sending module 1301, configured to send access control information of a second network that is related to a MINT function to a terminal.

The access control information of the second network that is related to the MINT function and/or a configuration of the terminal that is related to the MINT function is used for assisting the terminal in: in a case that an event corresponding to the MINT function occurs in a first network, perform access control on an access request, triggered by the MINT function, for accessing the second network.

In this embodiment of this application, the access control information includes one or more of the following:

(1) an access identity corresponding to the second network supporting the MINT function;

(2) an access category corresponding to the second network supporting the MINT function;

(3) an access probability corresponding to the access category and/or access identity;

(4) an unforbidden access request of a first category, where the access request of a first category is triggered by the MINT function;

(5) an unforbidden access request of a second category, where the access request of a second category is triggered by a user of a specific network due to the MINT function;

(6) a delayed access request of a third category, where the access request of a third category is triggered by the MINT function or a user of a specific network due to the MINT function; or (7) an access-delayed time.

The apparatus provided in this embodiment of this application can implement processes implemented by the method embodiment shown in FIG. 4, and achieve the same technical effects. To avoid repetition, details are not described herein again.

Figure 14:
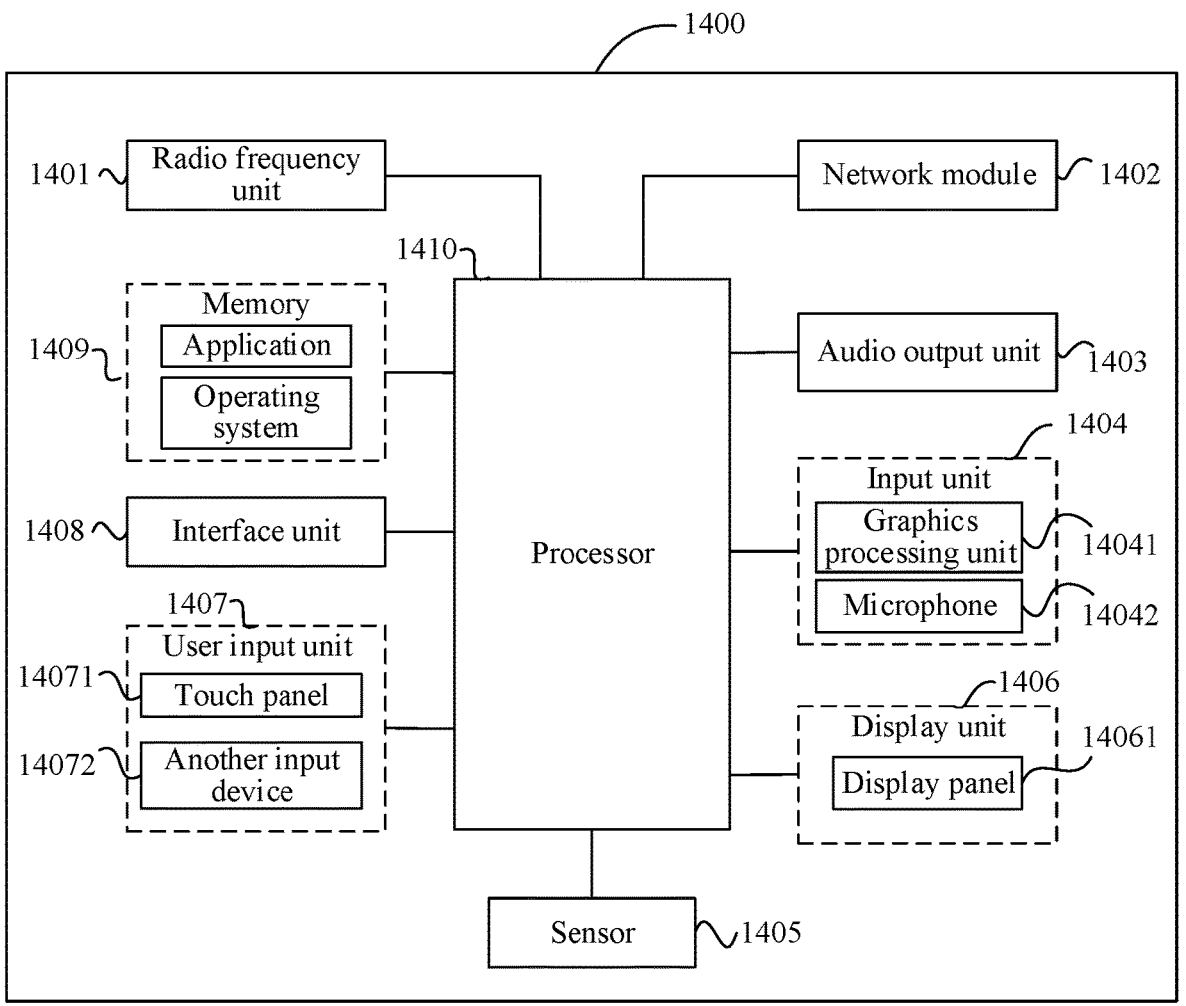
FIG. 14 is a schematic diagram of a terminal according to an embodiment of this application.

FIG. 14 is a schematic diagram of a hardware structure of a terminal for implementing an embodiment of this application.

The terminal 1400 includes but is not limited to: components such as a radio frequency unit 1401, a network module 1402, an audio output unit 1403, an input unit 1404, a sensor 1405, a display unit 1406, a user input unit 1407, an interface unit 1408, a memory 1409, and a processor 1410.

A person skilled in the art may understand that, the terminal 1400 may further include a power supply (such as a battery) for supplying power to the components. The power supply may be logically connected to the processor 1410 by using a power management system, thereby implementing functions such as charging, discharging, and power consumption management by using the power supply management system. The terminal structure shown in FIG. 14 constitutes no limitation on the terminal, and the terminal may include more or fewer components than those shown in the figure, or some components may be combined, or a different component deployment may be used. Details are not described herein again.

It should be understood that, in this embodiment of this application, the input unit 1404 may include a graphics processing unit (GPU) 14041 and a microphone 14042. The graphics processing unit 14041 performs processing on image data of a static picture or a video that is obtained by an image acquisition device (for example, a camera) in a video acquisition mode or an image acquisition mode. The display unit 1406 may include a display panel 14061, the display panel 14061 may be configured in a form such as a liquid crystal display or an organic light-emitting diode. The user input unit 1407 includes a touch panel 14071 and another input device 14072. The touch panel 14071 is also referred to as a touch screen. The touch panel 14071 may include two parts: a touch detection apparatus and a touch controller. The another input device 14072 may include, but not limited to, a physical keyboard, a functional key (such as a volume control key or a switch key), a track ball, a mouse, and a joystick. Details are not described herein again.

In this embodiment of this application, the radio frequency unit 1401 receives downlink data from a network side device, and sends the downlink data to the processor 1410 to be processed. In addition, the radio frequency unit 1401 sends uplink data to the network side device. The radio frequency unit 1401 usually includes but is not limited to an antenna, at least one amplifier, a transceiver, a coupler, a low noise amplifier, a duplexer, and the like.

The memory 1409 may be configured to store a software program or an instruction and various data. The memory 1409 may mainly include a program storage or instruction area and a data storage area. The program storage or instruction area may store an operating system, an application or an instruction required by at least one function (for example, a sound playing function and an image playing function), or the like. In addition, the memory 1409 may include a cache random access memory, and may further include a non-volatile memory. The non-volatile memory may be a read-only memory (ROM), a programmable read-only memory (Programmable ROM, PROM), an erasable programmable read-only memory (Erasable PROM, EPROM), an electrically erasable programmable read-only memory (Electrically EPROM, EEPROM), or a flash memory, for example, at least one magnetic disk storage device, a flash storage device, or other non-volatile solid-state storage devices.

The processor 1410 may include one or more processing units. Optionally, the processor 1410 may integrate an application processor and a modem processor. The application processor mainly processes an operating system, a user interface, an application or an instruction, and the like. The modem processor mainly processes wireless communication, such as a baseband processor. It may be understood that the modem processor may either not be integrated into the processor 1410.

Figure 15:
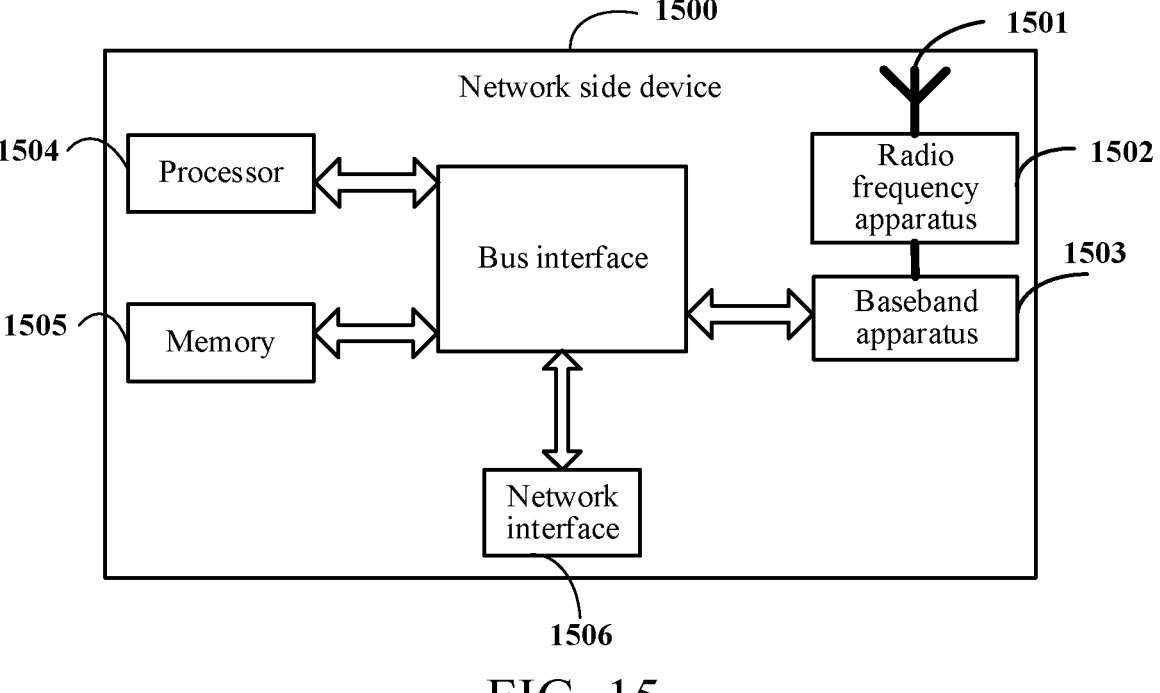
FIG. 15 is a schematic diagram of a network side device according to an embodiment of this application.

The terminal provided in this embodiment of this application can implement processes implemented by the method embodiment shown in FIG. 2 or FIG. 3, and achieve the same technical effects. To avoid repetition, details are not described herein again.

an embodiment of this application further provides a network side device. As shown in FIG. 15, the network side device 1500 includes: an antenna 1501, a radio frequency apparatus 1502, and a baseband apparatus 1503. The antenna 1501 is connected to the radio frequency apparatus 1502. In an uplink direction, the radio frequency apparatus 1502 receives information by using the antenna 1501, and sends the information to the baseband apparatus 1503 for processing. In a downlink direction, the baseband apparatus 1503 processes information to be sent, and sends the information to the radio frequency apparatus 1502. The radio frequency apparatus 1502 processes the received information and sends the information by using the antenna 1501.

The frequency band processing apparatus may be located in the baseband apparatus 1503. The method performed by the network side device in the foregoing embodiments may be implemented in the baseband apparatus 1503. The baseband apparatus 1503 includes a processor 1504 and a memory 1505.

The baseband apparatus 1503 may include, for example, at least one baseband plate. A plurality of chips are disposed on the baseband plate. As shown in FIG. 15, one of the plurality of chips is, for example, the processor 1504, and is connected to the memory 1505, to invoke a program in the memory 1505 to perform network device operations in the foregoing method embodiments.

The baseband apparatus 1503 may further include a network interface 1506, configured to exchange information with the radio frequency apparatus 1502. The interface is, for example, a common public radio interface (CPRI).

Specifically, the network side device in this embodiment of this application further includes: an instruction or a program stored in the memory 1505 and capable of being run on the processor 1504, where the processor 1504 may invoke the instruction or the program in the memory 1505 to perform a method executing by modules shown in FIG. 4, and achieve the same technical effects. To avoid repetition, details are not described herein again.

An embodiment of this application further provides a program product, where the program product is stored in a non-volatile storage medium, and the program product is executed by at least one processor to implement the steps of the processing method shown in FIG. 5.

An embodiment of this application further provides a readable storage medium, where the readable storage medium stores a program or an instruction, and the program or the instruction, when executed by a processor, implements the processes of the method embodiments shown in FIG. 5, and can achieve the same technical effects. To avoid repetition, details are not described herein again.

The processor is the processor in the terminal of the foregoing embodiments. The readable storage medium includes a computer-readable storage medium, for example, a computer read-only memory (ROM), a random access memory (RAM), a magnetic disk, or an optical disc.

An embodiment of this application further provides a chip, where the chip includes a processor and a communication interface, the communication interface is coupled with the processor, and the processor is configured to run a program or an instruction of a network side device, to implement the processes of the method embodiments shown in FIG. 2, and can achieve the same technical effects. To avoid repetition, details are not described herein again.

It should be understood that, the chip mentioned in this embodiment of this application may also be referred to as a system-level chip, a system chip, a chip system, a system-on-chip, or the like.

It should be noted that, in this specification, terms "comprise", "include", and any variants thereof are intended to cover a non-exclusive inclusion. Therefore, a process, a method, an object, or an apparatus that includes a series of elements only includes such elements, but also includes other elements not specified expressly, or may include inherent elements of the process, method, object, or apparatus. Without more limitations, elements defined by the sentence "including one" does not exclude that there are still other same elements in the processes, methods, objects, or apparatuses that include such elements. In addition, it should be noted that, the scope of the method and the apparatus in the embodiments of this application is not limited to a shown sequence or a discussed sequence to perform functions, and may further include performing functions in a basically simultaneous manner or a converse sequence based on the involved functions, for example, the described method may be performed in a sequence different from the description, and various steps may be added, removed, or combined. In addition, features described by referring to some examples may be combined in other examples.

A person of ordinary skill in the art may be aware that, in combination with the examples of units and algorithm steps described in the embodiments disclosed in this specification, this application may be implemented by using electronic hardware or a combination of computer software and electronic hardware. Whether the functions are executed in a mode of hardware or software depends on particular applications and design constraint conditions of the technical solutions. Those skilled in the art may use different methods to implement the described functions for each particular application, but such implementation is not to be considered beyond the scope of the present disclosure.

Those skilled in the art can clearly understand that for convenience and conciseness of description, the specific working processes of the above-described systems, apparatuses and units can be understood with reference to the corresponding processes in the above-described method embodiments and will not be repeated here.

In the embodiments provided in this application, it should be understood that the disclosed apparatus and method may be implemented in other ways. For example, the described apparatus embodiments are only exemplary. For example, the division of the units is only a logical function division and may be other divisions during actual implementation. For example, a plurality of units or components may be combined or integrated into another system, or some features may be ignored or not performed. In addition, the shown or discussed mutual couplings or direct couplings or communication connections may be implemented through some interfaces. The indirect couplings or communication connections between the apparatus or units may be implemented in electronic, mechanical, or other forms.

The units described as separate parts may or may not be physically separate. Parts displayed as units may or may not be physical units, and may be located in one position, or may be distributed on a plurality of network units. Some or all of the units may be selected according to an actual requirement to achieve the objectives of the solutions in the embodiments.

In addition, functional units in the embodiments of the present disclosure may be integrated into one processing unit, or each of the units may exist physically separated, or two or more units are integrated into one unit.

Through the foregoing description in the foregoing implementations, a person skilled in the art can clearly learn that the foregoing embodiment methods may be implemented by using software in combination with a necessary universal hardware platform. Certainly, the embodiment methods may be implemented by using hardware, but the former is a better implementation in many cases. Based on such an understanding, the technical solutions of this application essentially or the part contributing to the prior art may be implemented in a form of a software product. The computer software product is stored in a storage medium (such as a ROM/RAM, a magnetic disk, or an optical disc) and includes several instructions for instructing a terminal (which may be a mobile phone, a computer, a server, an air conditioner, a network device, or the like) to perform the methods described in the embodiments of this application.

It may be understood that the embodiments described in the embodiments of the present disclosure may be implemented by hardware, software, firmware, middleware, microcode, or a combination thereof. For implementation by hardware, a module, a unit, and a sub-unit may be implemented in one or more application-specific integrated circuits (ASIC), a digital signal processor (DSP), a digital signal processing device (DSP Device, DSPD), a programmable logic device (PLD), a field-programmable gate array (FPGA), a general purpose processor, a controller, a microcontroller, a microprocessor, and other electronic units configured to perform the functions described in the present disclosure, or a combination thereof.

For implementation by software, the technologies in the embodiments of the present disclosure may be implemented by performing the functional modules (for example, a process and a function) in the embodiments of the present disclosure. Software code may be stored in a memory and executed by a processor. The memory may be implemented inside the processor or outside the processor.

The embodiments of this application have been described above with reference to the accompanying drawings. This application is not limited to the specific embodiments described above, and the specific embodiments described above are merely exemplary and not limitative. Those of ordinary skill in the art may make various variations under the teaching of this application without departing from the spirit of this application and the protection scope of the claims, and such variations shall all fall within the protection scope of this application.

What is claimed is:

1. A method for a terminal to access a network, applied to a terminal, the method comprising:
   when an event corresponding to a minimization of service interruption MINT function occurs in a first network, performing access control on an access request, triggered by the MINT function, for accessing a second network, wherein performing access control on the access request, triggered by the MINT function, for accessing the second network comprises:
      determining, according to first information, whether the second network allows the access request of the terminal that is triggered by the MINT function to access the second network, wherein the first information comprises access control information of the second network that is related to the MINT function, and the access control information comprises: an access identity and an access probability corresponding to the access identity;
      wherein determining, according to the first information, whether the second network allows the access request of the terminal that is triggered by the MINT function to access the second network comprises:
      determining the access identity is indicative of that the terminal is configured with the MINT function; and
      determining, according to a random number generated by the terminal and the access probability, whether the access request of the terminal that is triggered by the MINT function is allowed to access the second network.

2. The method according to claim 1, wherein the first information further comprises a configuration of the terminal that is related to the MINT function.

3. The method according to claim 2, wherein the determining, according to first information, whether the second network allows the access request of the terminal that is triggered by the MINT function to access the second network further comprises:
   determining, according to an access identity selected by the terminal that corresponds to the MINT function and a received access identity corresponding to the second network supporting the MINT function, whether the second network allows the access request of the terminal that is triggered by the MINT function to access the second network.

4. The method according to claim 3, further comprising:
   determining whether the second network supports the MINT function; and
   if the second network supports the MINT function, selecting, upon an access attempt in the second network, the access identity corresponding to the second network supporting the MINT function.

5. The method according to claim 4, wherein the determining whether the second network supports the MINT function comprises:
   obtaining a function list supported by the second network; and
   determining whether the second network supports the MINT function according to the function list supported by the second network.

6. The method according to claim 4, wherein a universal subscriber identity module or a non-volatile memory of the terminal stores a first parameter, wherein the first parameter indicates the access identity corresponding to the MINT function.

7. The method according to claim 3, further comprising:
   obtaining an operator-defined access category corresponding to the MINT function through the first network or second network.

8. The method according to claim 1, further comprising:
   initiating the access request to the second network if the second network allows the terminal to access; or
   reattempting to access the second network if the second network currently does not allow the terminal to access.

9. The method according to claim 8, wherein the reattempting to access the second network comprises:
   determining an access barring condition according to the access control information of the second network;
   starting a timer according to the access barring condition; and
   reattempting to access the second network after the timer expires.

10. The method according to claim 1, further comprising:
receiving the access control information of the second network that is related to the MINT function.

11. The method according to claim 1, wherein the access identity is an access identity corresponding to the MINT function of the second network; and
   the access control information further comprises one or more of the following:
   an access category corresponding to the second network supporting the MINT function;
   an unforbidden access request of a first category, wherein the access request of a first category is triggered by the MINT function;
   an unforbidden access request of a second category, wherein the access request of a second category is triggered by a user of a specific network due to the MINT function;
   a delayed access request of a third category, wherein the access request of a third category is triggered by the MINT function or a user of a specific network due to the MINT function; or
   an access-delayed time.

12. A method for a terminal to access a network, applied to a network side device, the method comprising:
   sending access control information of a second network that is related to a MINT function to a terminal, wherein the access control information of the second network that is related to the MINT function and/or a configuration of the terminal that is related to the MINT function is used for assisting the terminal in: when an event corresponding to the MINT function occurs in a first network, performing access control on an access request, triggered by the MINT function, for accessing the second network, wherein the access control information comprises an access identity and an access probability corresponding to the access identity;

the access identity is indicative of that the terminal is configured with the MINT function; and the access control information is used for assisting the terminal in: determining, according to a random number generated by the terminal and the access probability, whether the access request of the terminal that is triggered by the MINT function is allowed to access the second network.

13. The method according to claim 12, wherein the access identity is an access identity corresponding to the MINT function of the second network; and the access control information further comprises one or more of the following:

an access category corresponding to the second network supporting the MINT function;

an unforbidden access request of a first category, wherein the access request of a first category is triggered by the MINT function;

an unforbidden access request of a second category, wherein the access request of a second category is triggered by a user of a specific network due to the MINT function;

a delayed access request of a third category, wherein the access request of a third category is triggered by the MINT function or a user of a specific network due to the MINT function; or an access-delayed time.

14. A terminal, comprising:

at least one hardware processor, a memory, and a program stored in the memory and executable by the at least one hardware processor, wherein the program, when executed by the at least one hardware processor, directs the terminal to implement:

when an event corresponding to a minimization of service interruption MINT function occurs in a first network, performing access control on an access request, triggered by the MINT function, for accessing a second network, wherein performing access control on the access request, triggered by the MINT function, for accessing the second network comprises:

determining, according to first information, whether the second network allows the access request of the terminal that is triggered by the MINT function to access the second network, wherein the first information comprises access control information of the second network that is related to the MINT function, and the access control information comprises: an access identity and an access probability corresponding to the access identity;

wherein determining, according to the first information, whether the second network allows the access request of the terminal that is triggered by the MINT function to access the second network comprises:

determining the access identity is indicative of that the terminal is configured with the MINT function; and determining, according to a random number generated by the terminal and the access probability, whether the access request of the terminal that is triggered by the MINT function is allowed to access the second network.

15. The terminal according to claim 14, wherein the first information further comprises a configuration of the terminal that is related to the MINT function.

16. The terminal according to claim 15, wherein the determining, according to first information, whether the second network allows the access request of the terminal that is triggered by the MINT function to access the second network further comprises:

determining, according to an access identity selected by the terminal that corresponds to the MINT function and a received access identity corresponding to the second network supporting the MINT function, whether the second network allows the access request of the terminal that is triggered by the MINT function to access the second network.

17. The terminal according to claim 16, wherein the program, when executed by the at least one hardware processor, the terminal further implements:

determining whether the second network supports the MINT function; and if the second network supports the MINT function, selecting, upon an access attempt in the second network, the access identity corresponding to the second network supporting the MINT function.

18. The terminal according to claim 17, wherein the determining whether the second network supports the MINT function comprises:

obtaining a function list supported by the second network; and determining whether the second network supports the MINT function according to the function list supported by the second network.

19. The terminal according to claim 17, wherein a universal subscriber identity module or a non-volatile memory of the terminal stores a first parameter, wherein the first parameter indicates the access identity corresponding to the MINT function.

20. A network side device, comprising at least one hardware processor, a memory, and a program stored in the memory and executable by the at least one hardware processor, wherein the program, when executed by the at least one hardware processor, implements the method according to claim 12.

* * * * *